Nov. 3, 1925.
C. F. PRESTON, SR
KEY
Filed Jan. 11, 1924
1,560,399
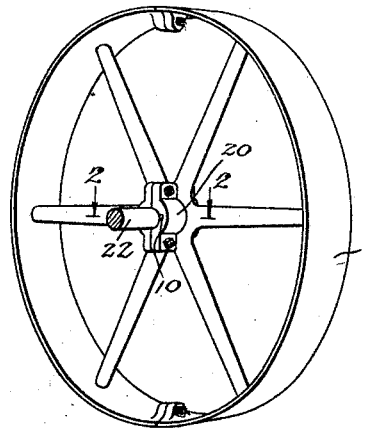
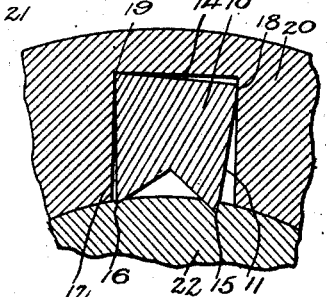
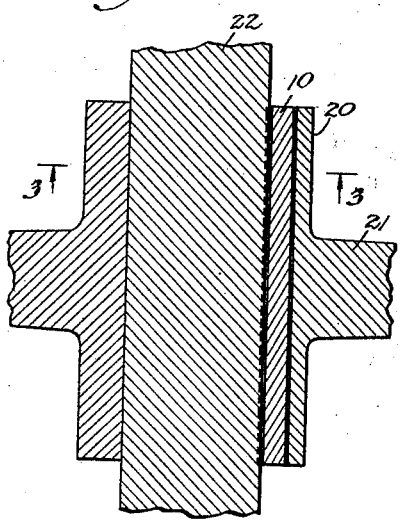
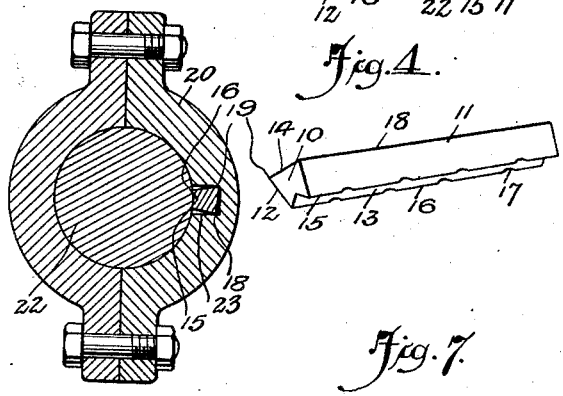
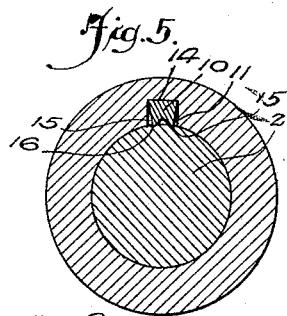 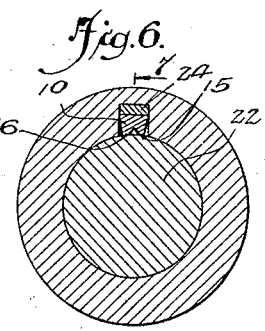 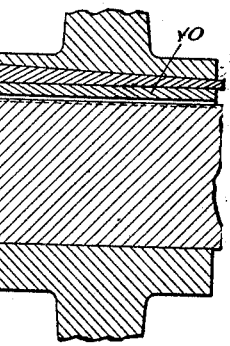
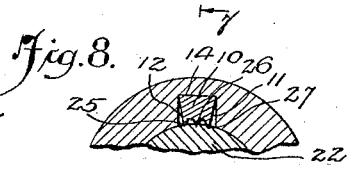
INVENTOR
Charles F. Preston Sr.
BY
ATTORNEYS Patented Nov. 3, 1925.

1,560,399

UNITED STATES PATENT OFFICE.

CHARLES F. PRESTON, SR., OF MAMARONECK, NEW YORK.

KEY.

Application filed January 11, 1924. Serial No. 685,646.

*To all whom it may concern:*

Be it known that I, CHARLES F. PRESTON, Sr., a citizen of the United States, and a resident of Mamaroneck, in the county of Westchester and State of New York, have invented new and useful Improvements in Keys, of which the following is a full, clear, and exact description.

This invention relates to keys primarily designed for attaching pulleys and the like to shafts.

Split pulleys are usually mounted on unslotted shafts and are retained in position by the friction between the inner face of the hub and the shaft. Many devices have been provided in conjunction with split pulleys for increasing the friction between the pulley and the shaft. Sometimes set screws are mounted in the hub of the pulley for engaging the shaft but usually means are provided for increasing the friction between the pulley and the shaft by strengthening the clamping means by which the pulleys are attached to the shaft. Normally such clamping means or set screws are sufficient to retain the pulleys in position and prevent slippage. During cold weather it requires increased power from the prime mover to set machinery in operation due to the fact that the machines are cold. In such cases the extra power exerted by the prime mover and transmitted through the pulleys results in the pulley loosening its grip on the shaft. Once a pulley has lost its grip on the shaft it is very difficult to prevent it from slipping. Consequently, when such an accident occurs it often necessitates shutting down of the machine shops and the like for some considerable time until the pulley has been removed and means introduced for more rigidly attaching the pulley in position. The efficiency of large machine shops is often seriously reduced in this way, causing the loss of large amounts of money. Sometimes pulleys are attached to the shafts by means of keys which engage in a slot in the pulley and a slot in the shaft. This method is not always satisfactory since it weakens the shaft. Pulleys mounted in this way will not stand a greater strain than what is required to shear off the key.

The general object of this invention is the provision of a cheap, simple and efficient key for attaching pulleys and the like to unslotted shafts.

This object is accomplished by providing a key, for mounting in key slots in pulleys and the like, consisting of a body having sides which converge toward the working face, and gripping members formed on the working face for engaging and embedding in the shaft.

This and other objects of the invention will be more clearly understood from the following detailed description and accompanying drawings.

Figure 1 is a perspective view of a split pulley attached to a shaft by means of the key;

Figure 2 is a horizontal section along the line 2—2, Figure 1;

Figure 3 is a cross section along the line 3—3, Figure 2, showing a cross section of the key;

Figure 4 is a perspective view of the key;

Figure 5 is a cross section showing the key attaching an ordinary unsplit pulley to a shaft;

Figure 6 shows a cross section of a modified form of the key, illustrating how a shim might be used for projecting the gripping members into engagement with the shaft;

Figure 7 is a longitudinal section along the line 7—7, Figure 6;

Figure 8 is another modification of the device, disclosing three lines of gripping members;

Figure 9 is an enlarged cross section of the key.

Referring to the above-mentioned drawings, the key consists of a body 10 having sides 11 and 12 converging toward the working face 13. Since the sides 11 and 12 converge toward the working face it follows that the outer face 14 is greater in width than the working face. As shown in Figure 4, gripping members 15 and 16 are formed at the inner extremities of the converging sides or along the line at which said converging sides intersect the working face. The working face between these gripping members would preferably be grooved so that the gripping members might the more easily embed themselves in any shaft with which they engage. In some cases, as shown in Figure 4, a plurality of notches 17 would be cut in each of the gripping members 15 and 16, dividing each of them into a plurality of sections. Such a construction is not necessary and the notches 17 might be dispensed with. Nor is it necessary that the sides 11 and 12 lie all in one plane but they might be curved, still giving a working face 13 which is narrower than the outer face 14. In this case the outer face 14 lies all in one plane and intersects the converging sides 11 and 12, forming corners 18 and 19.

Referring to Figures 3, 4 and 9, the hub 20 of a split pulley 21 is shown clamped on a shaft 22. A key slot 23 of rectangular cross section is provided in the hub 20 of the split pulley. The key is mounted in the key slot and the wedge-shaped gripping members 15 and 16 project slightly into the shaft since the depth of the key is slightly greater then the depth of the key slot 23. Let us consider that a force is exerted on the hub 20 of the pulley 21, tending to retain it in a clockwise direction. The corner 19 of the key is acted upon by the hub 20 tending to move it clockwise about the shaft 22. This force is transmitted through the body of the key and the wedge-shaped members 15 and 16 to the shaft 22. The greatest force will be exerted through the wedge-shaped gripping member 15. Consequently, this member will project further into the shaft 22 than the gripping member 16 but the latter also cuts into the shaft. Consequently, the pulley hub will be retained against rotation relative to the shaft by both gripping members 15 and 16. If the pulley is rotated counterclockwise the action will be the same as that described above. If each of the gripping members 15 and 16 has been divided into a plurality of sections by means of the notches 17 then ridges in the shaft will be formed where these notches occur and hold the key against endwise movement. A key of this type may be made to extend the full length of the hub or throughout only a part of the length of the hub, depending upon the results desired. In constructing a key for the key slot the preferred construction would be to make the outer face 14 equal in width to the width of the key slot. The converging sides would then carry the gripping members 15 and 16 inward from the walls of the key slot. Consequently, when a force is exerted on either of the corners 18 or 19 the key will tend to rotate rather than to be pushed bodily about the shaft. Consequently, the force required to rotate a pulley fastened by a key of this type would be sufficient to crush the key. Thus it will be seen that such a construction of the key will stand a tremendous force.

Referring to Figure 5, a key is shown mounted in the rectangular key slot of an unsplit pulley. The action in such case is similar to that described in the preceding paragraph. Referring to Figures 6 and 7, a modified form of the key is shown for mounting in tapered slots to attach either a split pulley or an upsplit pulley to a shaft. In this case the depth of main portion of the key is not as great as the depth of the key slot. Consequently a tapered shim 24 is provided for mounting in association with the main portion of the key so that the gripping members 15 and 16 will be projected slightly into the shaft 22. The action in this construction is similar to that described in the preceding paragraph since the outer face 14 of the key is made equal in width to the width of the key slot 23.

Considering Figure 8, a key provided with converging sides has three lines of gripping members 25, 26 and 27 formed on its working face. If these lines of gripping members are located closely together it is not necessary to locate the edges of the gripping members in an arc of a circle, but if the shaft is large and the gripping members are spaced some considerable distance apart it would be preferable to locate the edges of the gripping members in an arc of a circle. In this case if the pulley hub is rotated clockwise the gripping members 27 will dig into the shaft 22 first and the gripping members 26 and 25 will also dig into the shaft but not to such a great extent. The working face of the key might be provided with any number of lines of gripping members and each line of gripping members might have any number of sections.

I would state in conclusion that while the illustrated examples constitute practical embodiments of my invention I do not limit myself strictly to the exact details herein illustrated since manifestly the same can be considerably varied without departing from the spirit of the invention as defined in the appended claim.

Claim.

The combination with a hub for pulleys and the like, having a longitudinal rectangular groove in its inner face, a shaft engaging key in said groove, said key the widest at its outer edge and tapering toward its inner edge whereby the key may fulcrum on either of its outer corners in accordance with the direction of the pulley relative to the shaft, and said key having a plurality of relatively sharp inner edges to engage the shaft, said sharp edges sub-divided by a plurality of notches into a series of shaft engaging sections.

CHARLES F. PRESTON, Sr.